United States Patent
Choi et al.

(10) Patent No.: US 10,353,776 B2
(45) Date of Patent: Jul. 16, 2019

(54) MEMORY SYSTEM FOR PERFORMING READ RETRY OPERATION AND OPERATING METHOD THEREOF

(71) Applicant: SK hynix Inc., Gyeonggi-do (KR)

(72) Inventors: Gil Bok Choi, Daejeon (KR); Suk Kwang Park, Chungcheongbuk-do (KR); Min Sang Park, Chungcheongbuk-do (KR)

(73) Assignee: SK hynix Inc., Gyeonggi-do (KR)

( * ) Notice: Subject to any disclaimer, the term of this patent is extended or adjusted under 35 U.S.C. 154(b) by 162 days.

(21) Appl. No.: 14/930,351

(22) Filed: Nov. 2, 2015

(65) Prior Publication Data

US 2016/0357472 A1 Dec. 8, 2016

(30) Foreign Application Priority Data

Jun. 5, 2015 (KR) .................. 10-2015-0079976

(51) Int. Cl.
*G06F 11/14* (2006.01)
*G06F 11/00* (2006.01)

(52) U.S. Cl.
CPC ............. *G06F 11/14* (2013.01); *G06F 11/00* (2013.01)

(58) Field of Classification Search
CPC .... G06F 11/14; G06F 11/1068; G06F 3/0679; G06F 3/061; G06F 3/0619; G06F 11/1048; G06F 3/064; G06F 11/0793; G11C 16/26; G11C 11/5642; G11C 29/52; G11C 29/028; G11C 2029/0411; G11C 13/004; G11C 29/00
See application file for complete search history.

(56) References Cited

U.S. PATENT DOCUMENTS

| | | | | |
|---|---|---|---|---|
| 2013/0080858 A1* | 3/2013 | Lee | .......................... | G11C 16/26 714/773 |
| 2013/0159785 A1* | 6/2013 | Hashimoto | ........... | G06F 11/004 714/47.2 |
| 2013/0185612 A1* | 7/2013 | Lee | ..................... | G06F 11/0751 714/773 |
| 2014/0063967 A1* | 3/2014 | Ahn | ........................ | G11C 16/26 365/185.18 |
| 2014/0215133 A1* | 7/2014 | Seo | ..................... | G06F 12/0246 711/103 |
| 2016/0189770 A1* | 6/2016 | Abe | ..................... | G11C 11/5642 365/185.03 |
| 2016/0306593 A1* | 10/2016 | Xie | ........................ | G06F 3/0659 |

FOREIGN PATENT DOCUMENTS

KR 1020130084901 7/2013
KR 1020140096875 8/2014

* cited by examiner

*Primary Examiner* — Rocio Del Mar Perez-Velez
(74) *Attorney, Agent, or Firm* — IP & T GROUP LLP

(57) ABSTRACT

A memory system includes a semiconductor memory device including memory cells and an internal Random Access Memory (RAM); and a controller suitable for transmitting read retry table information to the semiconductor memory device when a read operation for the memory cells fails, wherein the internal RAM stores a read retry table during operation of the memory system, and wherein the semiconductor memory device performs a read retry operation with a read retry voltage determined based on the read retry table and the read retry table information.

16 Claims, 8 Drawing Sheets

MEMORY SYSTEM FOR PERFORMING READ RETRY OPERATION AND OPERATING METHOD THEREOF

CROSS-REFERENCE TO RELATED APPLICATIONS

The present application claims priority to Korean patent application number 10-2015-0079976, filed on Jun. 5, 2015, the entire disclosure of which is herein incorporated by reference in its entirety.

BACKGROUND

1. Field

The present disclosure relates to an electronic device, and more particularly, to a memory system and an operating method thereof.

2. Discussion of Related Art

A semiconductor memory device is a memory device implemented by using a semiconductor, such as silicon (Si), germanium (Ge), gallium arsenide (GaAs), an indium phosphide (InP). Semiconductor memory devices are generally classified into volatile memory devices and nonvolatile memory devices.

Volatile memory devices are unable to store data without a constant source of power. Examples of volatile memory devices include Static RAM (SRAM), Dynamic RAM (DRAM), Synchronous DRAM (SDRAM), and the like. Nonvolatile memory devices can store data even without a constant source of power. Examples of nonvolatile memory devices include Read Only Memory (ROM), Programmable ROM (PROM), an Electrically Programmable ROM (EPROM), Electrically Erasable and Programmable ROM (EEPROM), flash memory, Phase-change RAM (PRAM), Magnetic RAM (MRAM), Resistive RAM (RRAM), Ferroelectric RAM (FRAM), and the like. Flash memory is generally divided into a NOR type and a NAND type.

SUMMARY

The present disclosure provides a memory system capable of minimizing a decrease in speed thereof due to frequent performance of a read voltage level parameter setting command, and an operating method thereof.

An exemplary embodiment of the present disclosure provides a memory system, including: a semiconductor memory device including memory cells and an internal Random Access Memory (RAM); and a controller suitable for transmitting read retry table information of the semiconductor memory device when a read operation for the memory cells fails, wherein the internal RAM stores a read retry table during operation of the memory system, and wherein the semiconductor memory device performs a read retry operation with a read retry voltage determined based on the read retry table and the read retry table information.

The read retry table information may be a set number indicating one among a plurality of offset voltages included in the read retry table.

The read retry table information may be any one of a plurality of offset voltages included in the read retry table or a command directing to apply one of the plurality of offset voltages of the read retry table according to a predetermined order.

The controller may include an error correcting unit suitable for correcting an error bit of read data, comparing the number of error bits of the read data with the number of correctable error bits, and determining whether the read retry operation passes or fails.

The controller may further control the read retry voltage to be stored in the semiconductor memory device when the read retry operation passes.

When power is supplied to the memory system, the semiconductor memory device may fetch the read retry table from the memory cell to the internal RAM.

When the read retry operation fails the predetermined number of times, the controller may determine a page region, to which the read retry operation fails, as defective.

The read retry table information may be fetched from a One Time Programmable (OTP) region of the memory cells to the internal RAM during operation of the memory system.

The memory system may further include a host interface unit suitable for communicating with a host connected with the memory system.

The memory system may further include a Read Only Memory (ROM) suitable for storing code data for interfacing with the host.

Another exemplary embodiment of the present disclosure provides a method of operating a memory system, including: storing a read retry table in an internal Random Access Memory (RAM) of a semiconductor memory device; generating read retry table information when a read operation for a memory cell of the semiconductor memory device fails; determining a read retry voltage based on the read retry table information and the read retry table stored in the internal RAM; and performing a read retry operation with the determined read retry voltage.

The read retry table information may be a set number indicating one among a plurality of offset voltages included in the read retry table.

The read retry table information may be any one of a plurality of offset voltages included in the read retry table or a command directing to apply one of the plurality of offset voltages of the read retry table according to a predetermined order.

The method may further include correcting an error bit of read data, comparing the number of error bits of the read data with the number of correctable error bits, and determining whether the read retry operation passes or fails.

The method may further include storing the read retry voltage when the read retry operation passes.

The storing of the read retry table in the internal RAM may be performed by fetching the read retry table from the memory cell to the internal RAM.

The method may further include determining a page region, to which the read retry operation fails, as defective when the read retry operation fails the predetermined number of times.

The storing of the read retry table in the internal RAM is performed by fetching the read retry table information from a One Time Programmable (OTP) region of the memory cells to the internal RAM during operation of the memory system.

According to the various exemplary embodiments of the present disclosure, read retry table information is not disclosed externally, which is advantageous in terms of security and preventing operation speed from being decreased.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The above and other features and advantages of the present disclosure will become more apparent to those of ordinary skill in the art by describing in detail embodiments thereof with reference to the attached drawings in which.

DETAILED DESCRIPTION

Hereinafter, an exemplary embodiment of the present disclosure will be described in detail with reference to the accompanying drawings.

In the description, that which is well-known in the art may be omitted so that the inventive concept is more clearly presented.

Advantages and features of the present disclosure and methods of achieving the advantages and features will be made clear by reference to exemplary embodiments described in detail below together with the accompanying drawings. However, the present disclosure is not limited to the exemplary embodiments set forth below, and may be embodied in various other forms. The present exemplary embodiments are for rendering the description of the present disclosure complete and are set forth to provide a complete understanding of the scope of the invention to a person with ordinary skill in the technical field to which the present disclosure pertains, and the present disclosure will only be defined by the scope of the claims.

Figure 1:
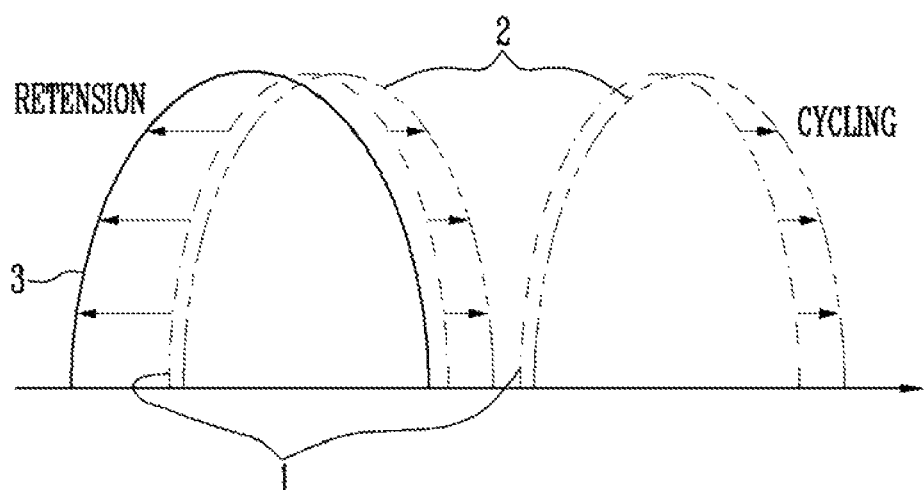
FIG. 1 is a threshold voltage distribution illustrating semiconductor memory cells.

FIG. 1 is a threshold voltage distribution illustrating semiconductor memory cells. FIG. 1 shows a change in a threshold voltage distribution of the semiconductor memory cells.

Referring to FIG. 1 an initial threshold voltage distribution 1 of memory cells is changed to a distribution 2 in a right direction according to an increase in the number of times of program/erase operation performance (the number of cycles).

The initial threshold voltage distribution 1 of the memory cells is changed to a distribution 3 in a left direction due to a retention characteristic related to maintenance of data. The retention characteristic means that a threshold voltage of a memory cell is decreased due to a discharge of electrons stored in a floating gate (or a charge storing layer) over time.

In addition to the phenomenon illustrated in FIG. 1, the threshold voltage distribution of the memory cells may be changed for various reasons. In this case, a read operation of the memory cells may be failed according to a read voltages. Particularly, when a predetermined read voltage is applied, a cell having a threshold voltage lower than the read voltage is read as "1" and a cell having a threshold voltage higher than the read voltage is read as "0". However, when the threshold voltage distribution is changed and two adjacent threshold voltage distributions overlap, the read operation may be failed (hereinafter, referred to as"read fail").

When the read fail occurs, the read operation may be performed again by changing the read voltage. This is called read retry, and in order to change the read voltage during the read retry operation, a Read Retry Table (RRT) including an offset voltage value may be referred to. Particularly, the memory device may change the read voltage based on an offset voltage included in the RRT and re-perform the read operation (hereinafter, referred to as "read retry") with the changed read voltage.

Figure 2:
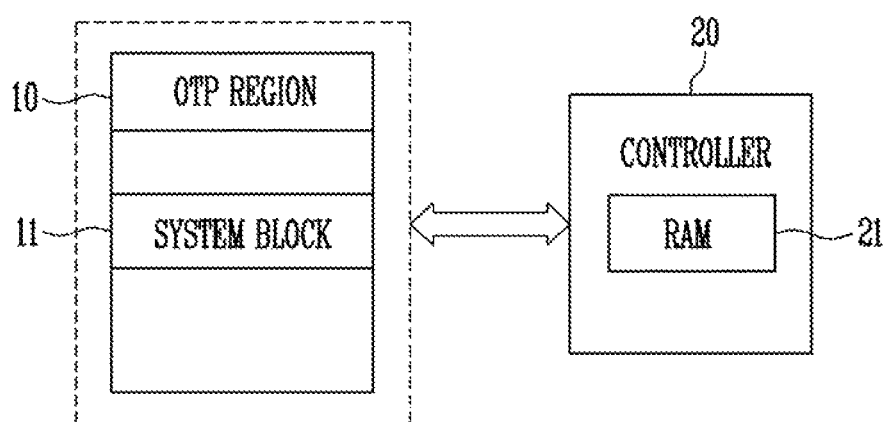
FIG. 2 is a block diagram illustrating a read retry operation in the related art.

FIG. 2 is a block diagram illustrating a read retry operation in the related art.

The read retry table may be stored in a One Time Programmable (OTP) region 10 of the memory cell. Once programmed, additional programming cannot be performed permanently on the OTP region 10. In the OTP region 10, data may be programmed through an OTP command. The size and location of the OTP region 10 is not limited in the present disclosure.

Referring to FIG. 2, a controller 20 copies the RRT from the OTP region 10 to a system block 11, and stores the RRT of the system block 11 in a RAM 21 inside the controller 20.

When the read fail occurs, the controller 20 calculates a voltage for the read retry by referring to the RRT stored in the RAM 21 inside the controller 20. The controller 20 may simultaneously or sequentially transmit the calculated read retry voltage and the read command to the memory cell.

According to the read retry operation in the related art, when the read fall occurs, a parameter setting operation is performed in order to set a read level (read voltage) by referring to the RRT. During the parameter setting operation, the controller 20 stores the RRT of the system block 11 in the RAM 21, calculates a voltage for the read retry by referring to the RRT stored in the RAM 21, and transmits a command so that a value of a register located inside the semiconductor memory device is changed to the calculated voltage value. Accordingly, as the number of times of the parameter setting operation increases, the operation speed of the memory device may be decreased.

Particularly, in flash memory, as a cell level becomes higher (for example, from the single level cell to the triple level cell), the number of read levels to be set is increased and thus the number of parameter setting operations is also increased. Further, as a stack size of the memory becomes greater (for example, from the single die package to the octal die package), the number of registers to be set is increased and thus the number of parameter setting operations may also be increased.

Accordingly, an improved read retry operating method, in which the controller does not fetch the RRT whenever resetting the read voltage, is suggested.

Figure 3:
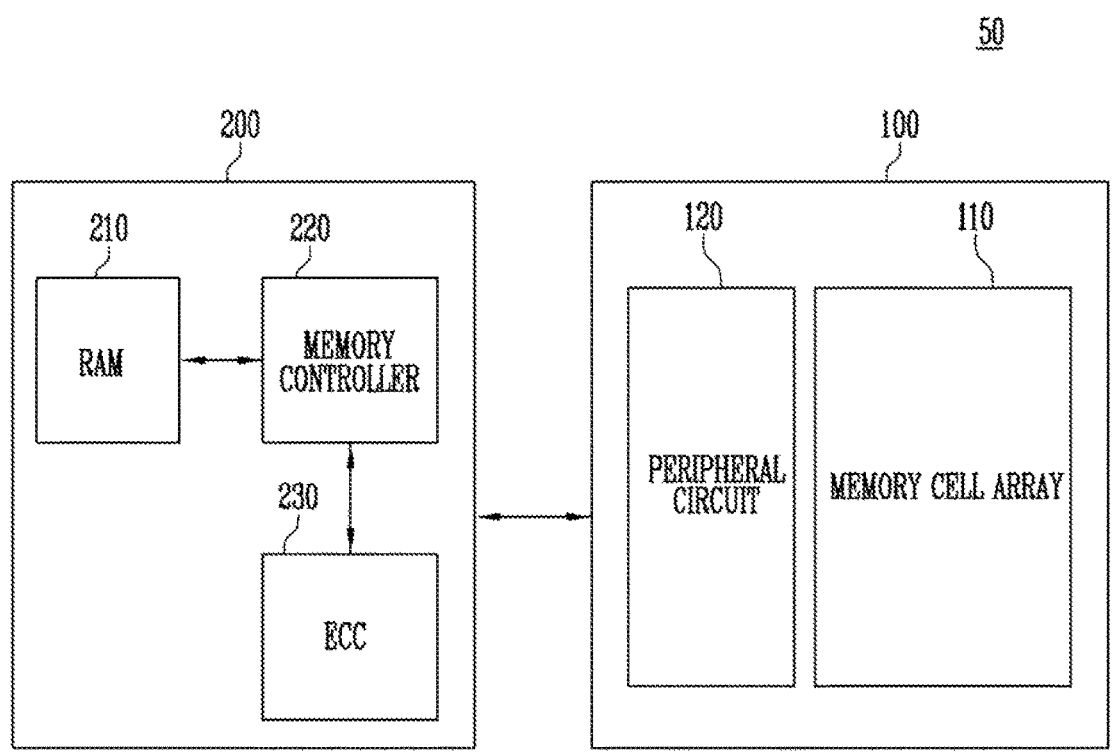
FIG. 3 is a block diagram illustrating a memory system according to an exemplary embodiment of the present disclosure.

FIG. 3 is a block diagram illustrating a memory system 50 according to an exemplary embodiment of the present disclosure.

Referring to FIG. 3, the memory system 50 includes a semiconductor memory device 100 and a controller 200.

The semiconductor memory device may be a NAND flash memory, a Vertical NAND (VNAND) flash memory, a NOR flash memory, a Resistive Random Access Memory (RRAM), a Phase-Change memory (PRAM), a Magneto-resistive Random Access Memory (MRAM), a Ferroelectric Random Access Memory (FRAM), a Spin Transfer Torque Random Access Memory (STT-RAM), and the like. Further, the semiconductor memory device 100 of the present disclosure may be implemented in a three-dimensional array structure. The present disclosure may be applied to a Charge Trap Flash (CTF), in which a charge storing layer is formed of an insulating layer, as well as a flash memory device, in which a charge storing layer is formed of a conductive floating gate.

The semiconductor memory device 100 includes a memory cell array 110, and a peripheral circuit 120 for driving the memory cell array 110. The memory cell array 110 includes a plurality of non-volatile memory cells.

The memory cell array 110 includes a plurality of memory blocks BLK1 to BLKz (z is an integer larger than 2), and the plurality of memory blocks may be divided into and used as an OTP region, a system block, and a user block according to usage thereof.

The peripheral circuit 120 is operated in response to a control by the controller 200. The peripheral circuit 120 may program data in the memory cell array 110 in response to the control of the controller 200. The peripheral circuit 120 may read data from the memory cell array 110 and erase data of the memory cell array 110.

In various exemplary embodiments, a read operation and a program operation of the semiconductor memory device 100 may be performed in units of pages. An erase operation of the semiconductor memory device 100 may be performed in a unit of a memory block.

During the program operation, the peripheral circuit 120 may receive a command indicating a program operation, a physical block is address, and write data from the controller 200, When one memory block and one page included in the corresponding memory block are selected by a physical block address, the peripheral circuit 120 may program write data in the selected page.

During the read operation, the peripheral circuit 120 may receive a command indicating a read operation (hereinafter, a "read command") and a physical block address from the controller 200. The peripheral circuit 120 may read data from one page included in the memory block selected by the physical block address and output the read data (hereinafter, "page data") to the controller 200.

During the erase operation, the peripheral circuit 120 may receive a command indicating an erase operation and a physical block address from the controller 200. The physical block address may specify one memory block. The peripheral circuit 120 may erase data of a memory block corresponding to the physical block address.

The controller 200 controls general operations of the semiconductor memory device 100. The controller 200 may access the semiconductor memory device 100 in response to a request from an external host.

The controller 200 includes a RAM 210, a memory controller 220, and an error correcting block 230.

The RAM 210 operates in response to the control of the memory controller 220. The memory controller 220 is configured to control read, write, erase, and background operations of the semiconductor memory device 100. The memory controller 220 is configured to drive firmware for controlling the semiconductor memory device 100.

When a host transmits a read request, the memory controller 220 may provide the semiconductor memory device 100 with a read command in order to identify data of a page (that is, a selected page) corresponding to the read request. The memory controller 220 may convert a logical block address included in the read request into a physical block address. As an exemplary embodiment, the memory controller 220 performs a function of a Flash Translation Layer (FTL). The memory controller 220 may provide the generated physical block address to the semiconductor memory device 100 together with the read command.

In response to the read command, the semiconductor memory device 100 reads page data from the selected page, and transmits the read page data to the controller 200. The error correcting block 230 determines whether an error is included in the page data in response to the control of the memory controller 220. For example, the controller 200 may decode the page data according to an error correction code. It may be understood that various methods may be used as the error correction code. For example, methods such as Bose-Chaudhri-Hocquenghem Code (BCH code), a Reed Solomon Code, a Hamming code, and a Low Density Parity Check Code (LDPC code), may be used. When the predetermined number of error bits or more is included in the page data, decoding may fail. When the predetermined number of error bits or less is included in the page data, decoding may succeed.

The success of the decoding indicates that the corresponding read command passes. The failure of the decoding indicates that the corresponding read command fails. When the decoding is successful, the controller 200 outputs the page data, of which the error is corrected, to the host.

Figure 4:
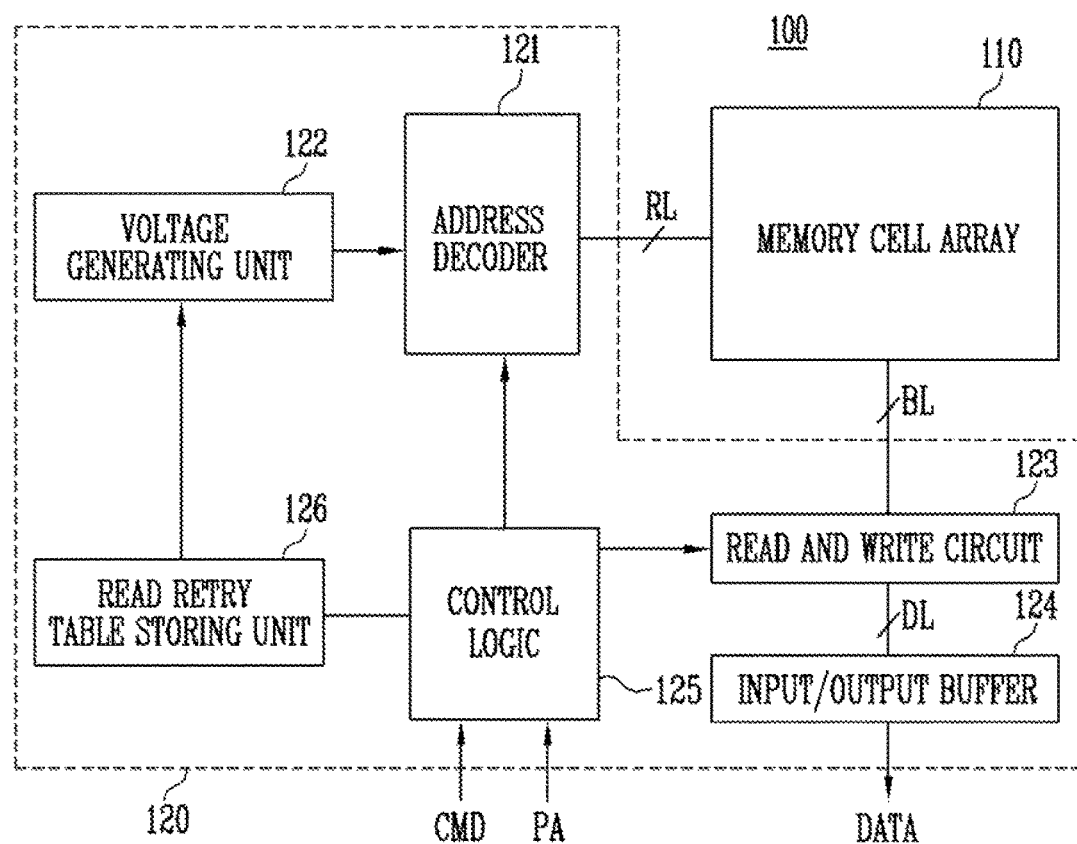
FIG. 4 is a block diagram illustrating a semiconductor memory device shown in FIG. 3.

FIG. 4 is a block diagram illustrating the semiconductor memory device 100 described with reference to FIG. 3.

Referring to FIG. 4, the semiconductor memory device 100 includes the memory cell array 110 and the peripheral circuit 120.

The peripheral circuit 120 includes an address decoder 121, a voltage generating unit 122, a read and write circuit 123, an input/output buffer 124, a control logic 125, and a RRT storing unit 126.

The address decoder 121 is connected to the memory cell array 110 through row lines RL. The address decoder 121 is configured to be operated in response to the control by the control logic 125. The address decoder 121 receives a physical block address PA through the control logic 125.

The read operation of the semiconductor memory device 100 is performed in one page units. The physical block address PA received during the read operation includes at least one of a block address and a row address.

The address decoder 121 is configured to decode a block address in the received address ADDR. The address decoder 121 selects one memory block among the plurality of memory blocks BLK1 to BLKz according to the decoded block address.

The address decoder 121 is configured to decode a row address in the received physical block address PA and select one word line in the selected memory block. Accordingly, one page is selected. The address decoder 121 may apply a read voltage (or a test voltage) from the voltage generating unit 122 to the selected word line, and apply a pass voltage from the voltage generating unit 122 to non-selected word lines.

The voltage generating unit 122 is operated in response to the control by the control logic 125. The voltage generating unit 122 generates an internal power voltage by using an external power voltage supplied to the semiconductor memory device 100. For example, the voltage generating unit 122 generates the internal power voltage by regulating the external power voltage. The generated internal power voltage is provided to the address decoder 121, the read and write circuit 123, the input/output buffer 124, and the control logic 125 and is used as an operation voltage of the semiconductor memory device 100.

The voltage generating unit 122 generates a plurality of voltages by using at least one of the external power voltage and the internal power voltage. In one embodiment, the voltage generating unit 122 includes a plurality of pumping capacitors receiving the internal power voltage, and selectively activates the plurality of pumping capacitors in response to the control by the control logic 125 to generate a plurality of voltages. For example, the voltage generator 122 generates a read voltage and a pass voltage having a higher level than that of the read voltage during the read operation. The generated voltages may be provided to the address decoder 121.

The control logic 125 is configured to control general operations of the semiconductor memory device 100. The control logic 125 may receive a command CMD and the physical block address PA. During the read operation, the command CMD may be a read command. Otherwise, when the read operation fails, the control logic 125 may receive a command for the RRT from the controller 200. During the program operation, the command CMD may indicate a program operation. During the erase operation, the command CMD may indicate an erase operation. The control logic 125 is configured to control the address decoder 121, the voltage generating unit 122, the read and write circuit 123, the input/output buffer 124, and the RRT storing unit 126 in response to the received command CMD.

When power is supplied to the memory system 50 of the present disclosure, the RRT storing unit 126 may store the RRT provided from the memory cell array under the control by the control logic 125. The RRT may include a plurality of offset voltage values and corresponding set numbers. The number and values of offset voltage values included in the RRT may be differently determined according to the characteristics of the memory device or a selection of a designer. The RRT storing unit 126 may be a register or an SRAM having a storage space of a predetermined size. Accordingly, as long as the power is maintained, the RRT is continuously stored in the RRT storing unit 126. In various embodiments, the RRT storing unit 126 may be included inside the control logic.

The read and write circuit 123 is connected to the memory cell array 110 through the bit lines BL. The read and write circuit 123 operates in response to the control logic 125.

The read and write circuit 123 reads and stores the page data DATA from the selected page of the memory cell 110 during the read operation. The page data DATA is transmitted to the input/output buffer 124 through a data line DL.

The input/output buffer 124 is connected to the read and write circuit 123 through the data lines DL. The input/output buffer 124 operates in response to the control logic 125. The input/output buffer 124 outputs the page data DATA transmitted through the data lines DL from the read and write circuit 123 to the controller 200 (see FIG. 1).

The memory cell array 110 includes the plurality of memory cells. The plurality of memory cells is connected to the address decoder 121 through the row lines RL, and is connected to the read and write circuit 123 through the bit lines BL.

The plurality of memory cells included in the memory cell array 110 may be divided into a plurality of regions according to usage thereof. The plurality of regions may include an OTP region, a system block, and a user block. Once programmed, additional programming cannot be performed on the OTP region. In the OTP region, data may be programmed through an OTP command. Size and location of the OTP region is not limited in the present disclosure. The RRT may be originally stored in the OTP region.

Figure 5:
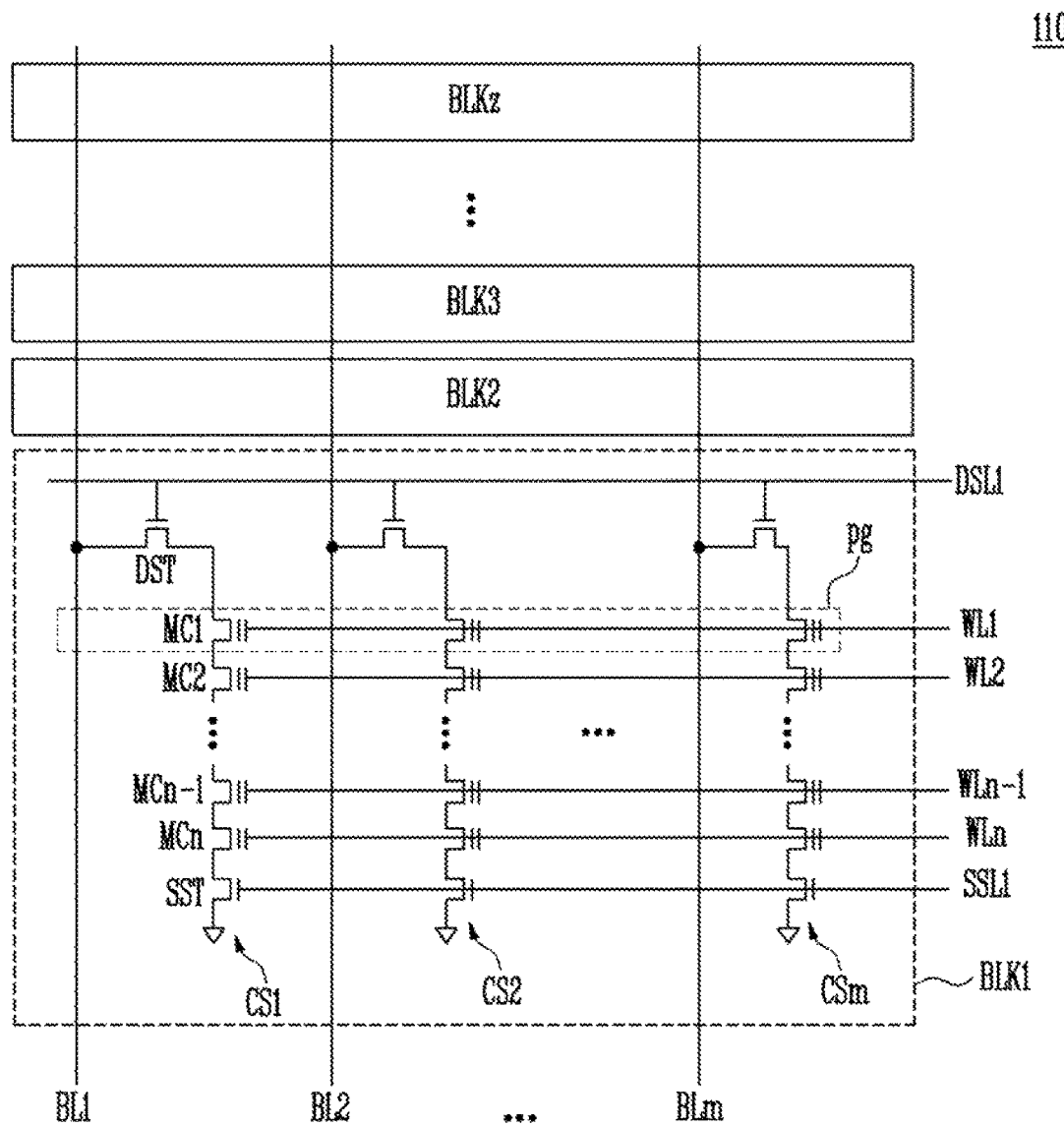
FIG. 5 is a block diagram illustrating a memory cell array shown in FIG. 3.

FIG. 5 is a block diagram illustrating the memory cell array described with reference to FIG. 3.

Referring to FIG. 5, the memory cell array 110 includes the plurality of memory blocks BLK1 to BLKz. The first to $z^{th}$ memory blocks BLK1 to BLKz are commonly connected to the first to $m^{th}$ bit lines BL1 to BLm. The first to $m^{th}$ bit lines BL1 to BLm configure the bit lines BL of FIG. 2. Each of the plurality of memory blocks BLK1 to BLKz configures an erase unit.

In FIG. 5, only memory block BLK1 is illustrated. Each of the remaining memory blocks BLK2 to BLKz are configured in the same manner as that of the first memory block BLK1.

The memory block BLK1 includes a plurality of cell strings CS1 to CSm. The first to $m^{th}$ cell strings CS1 to CSm are connected to the first to $m^{th}$ bit lines BL1 to BLm, respectively.

Each of the first to $m^{th}$ cell strings CS1 to CSm includes a drain selection transistor DST, serially connected memory cells MC1 to MCn, and a source selection transistor SST. The drain selection transistor DST is connected to a drain selection line DSL1. The first to $n^{th}$ memory cells MC1 to MCn are connected to first to $n^{th}$ word lines WL1 to WLn, respectively. The source selection transistor SST is connected to a source selection line SSL1.

A drain side of the drain selection transistor DST is connected to a corresponding bit line. A source side of the source selection transistor SST is connected to a reference voltage node. In an embodiment, the source side of the source selection transistor SST is connected to a common source line (not illustrated), and the common source line may be biased with a reference voltage.

Memory cells connected to the word line of one of the first to $m^{th}$ cell strings CS1 to CSm configure one page pg. Accordingly, one memory block BLK includes a plurality of pages.

The drain selection line DSL1, the first to $n^{th}$ word lines WL1 to WLn, and the source selection line SSL1 are included in the row lines RL of FIG. 2. The drain selection line DSL1, the first to $n^{th}$ word lines WL1 to WLn, and the source selection line SSL1 are controlled by the address decoder 121. The first to $m^{th}$ bit lines BL1 to BLm are controlled by the read and write circuit 123.

Hereinafter, an operating method of the memory system according to the present disclosure will be described with reference to FIGS. 6 and 7 in more detail.

Figure 6:
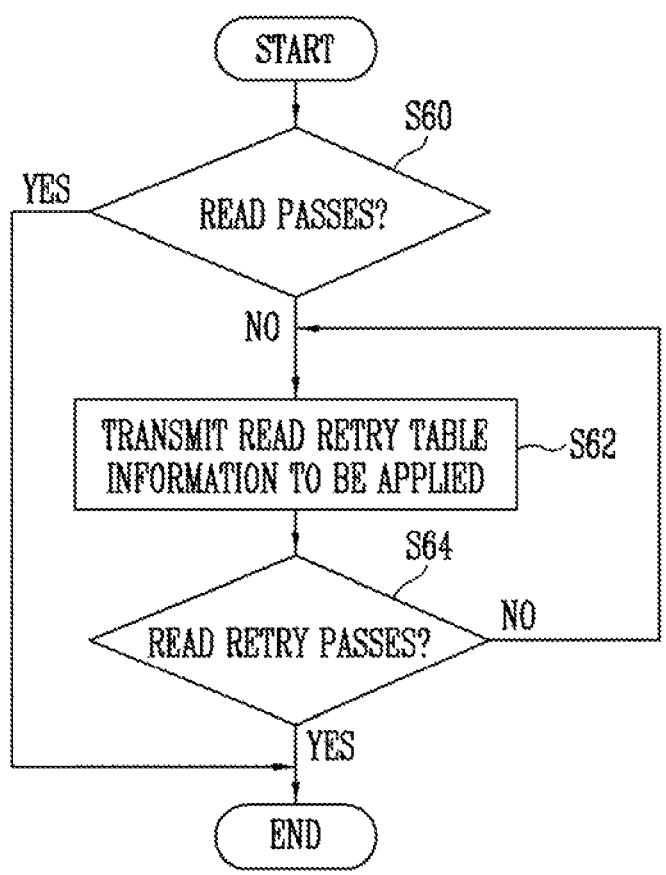
FIG. 6 is a flowchart illustrating an operation of a controller according to an exemplary embodiment of the present disclosure.

FIG. 6 is a flowchart illustrating an operation of the controller 20 according to an exemplary embodiment of the present disclosure.

The read voltage may be determined by a sum of a default voltage and an offset voltage. The offset voltage is a voltage value to be added or subtracted in order to change the read voltage due to various reasons. The RRT may include the plurality of offset voltage values and respectively corresponding unique set numbers in a table form. The number and values of offset voltage values included in the RRT may be differently determined according to the characteristics of the memory device or a selection of a designer.

The RRT may be fetched to the RRT storing unit 126 from the memory cell array 110 (especially the OTP region) of the semiconductor memory device 100 at power on of the memory system 50. The RRT storing unit 126 may be formed of an SRAM. Accordingly, the RRT storing unit 126 may keep the RRT while power is supplied.

At step S60, the controller may determine whether the currently performed read operation passes. An initial read voltage for the read operation may be a predetermined voltage set as a default value. The controller 200 may determine whether the read operation passes based on whether the lumber of error bits included in read data exceeds the number of correctable error bits. However, the method of determining whether the read operation passes is not limited in the present disclosure.

When the read operation for a corresponding page is determined as a pass at step S60, the read operation is terminated. When the read operation is determined as a fail at step S60, the controller 200 may transmit RRT information to the semiconductor memory device 100 in order to perform the read retry operation at step S62.

Here, the RRT information transmitted by the controller 200 may be one of the set numbers corresponding to one of the plural offset voltage values of the RRT to be applied during the read retry operation. As noted, the RRT may include the plurality of offset voltage values and corresponding set numbers. In various exemplary embodiments, the RRT information transmitted by the controller 200 may be any one of the offset voltage value included in the RRT or a command directing to apply the offset voltage of the RRT according to a predetermined order.

In the present disclosure, the controller 200 transmits only the RRT information while the controller 200 does not fetch the RRT to the RAM 210 from the memory cell array 110 for each read retry operation. Accordingly, it is possible to prevent an operation speed of the memory system from being decreased.

At step S64, the controller may perform the read retry operation, receive a result of the read retry (not illustrated), and determine whether the read retry operation passes. The controller may determine the pass of the read retry operation in the same way as the read operation. That is, the controller 200 may determine whether the read retry operation passes based on whether the number of error bits included in read data exceeds the number of correctable error bits. However, the method of determining whether the read retry operation passes is not limited in the present disclosure.

As a result of the determination of step S64, when the read retry operation is determined to fail, the controller may transmit RRT information to the semiconductor memory device 100 for a next read retry at step S62.

In various exemplary embodiments, when the read retry determined to a pass at step S64, the controller 200 may store the set number indicating the offset voltage value in the RRT information, with which the read retry operation passes. Accordingly, when the read operation is performed on the corresponding page later, the offset voltage corresponding to the stored RRT set number may be directly applied.

Figure 7:
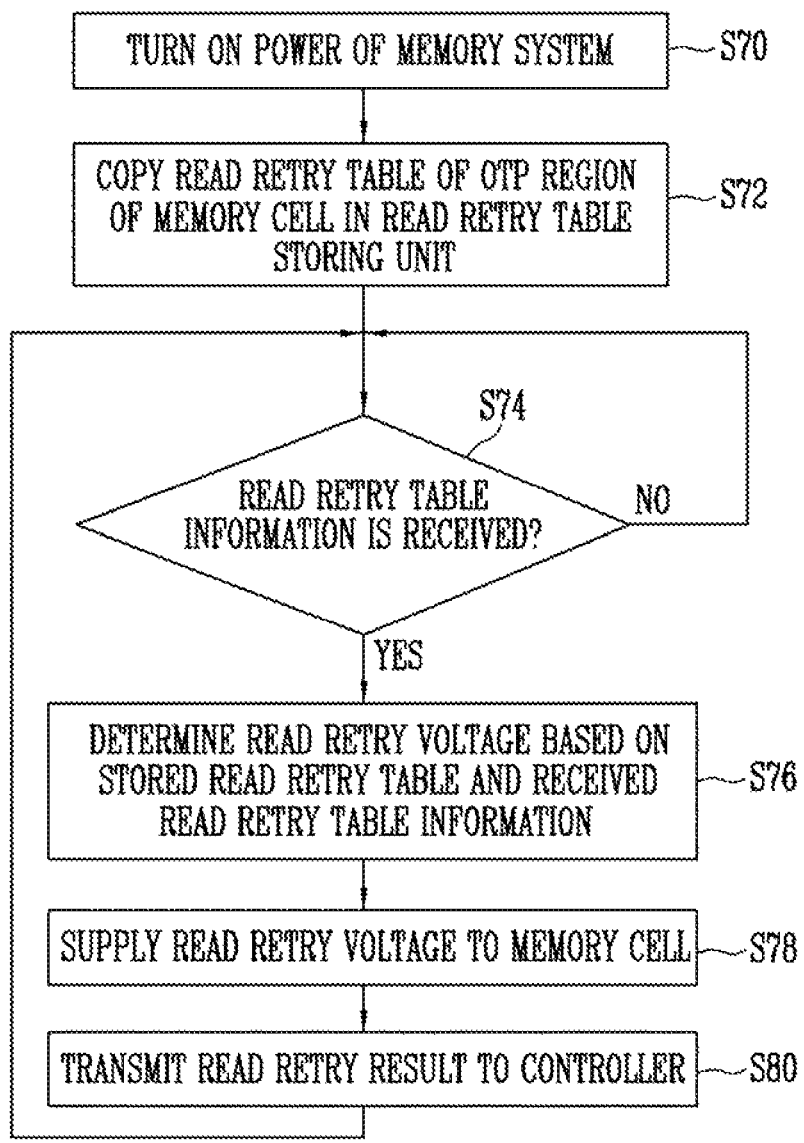
FIG. 7 is a flowchart illustrating an operation of a semiconductor memory device according to an exemplary embodiment of the present disclosure.

FIG. 7 is a flowchart illustrating an operation of the semiconductor memory device 100 according to an exemplary embodiment of the present disclosure.

According to FIG. 7, when power is supplied to the memory system including the controller at step S70, the semiconductor memory device 100 copies the RRT stored in the OTP region of the memory cell array 110 to the RRT storing unit at step S72.

At step S74, the semiconductor memory device 100 may determine whether RRT information is received from the controller 200. Here, the RRT information transmitted by the controller 200 may be one of the set numbers corresponding to one of the offset voltage values to be applied during the read retry operation.

At step S74, the semiconductor memory device 100 stands by until the RRT information is received. That is, the semiconductor memory device 100 may recognize the reception of the RRT information as triggering of the read retry operation.

As a result of the determination at step S74, when the RRT information is received, the semiconductor memory device 100 determines a read retry voltage based on the RRT stored in the RRT storing unit 126 and the received RRT information at step S76

Particularly, the control logic 125 of the semiconductor memory device 100 controls the voltage generating unit 122 to generate the read retry voltage based on one of the offset voltage values indicated by the RRT information provided from the controller 200 in the RRT stored in the RRT storing unit 126.

The semiconductor memory device 100 supplies e read retry voltage to the memory cell 110 at step S78, and transmits the data read by the read retry to the controller 200 at step S80, and then returns to step S74.

In various exemplary embodiments, although not illustrated in the drawings, the semiconductor memory device may not perform the read retry operation after failing to pass the read retry operation the predetermined number of times. In this case, the page region, for which the read operation fails, may be treated as a defective cell.

Figure 8:
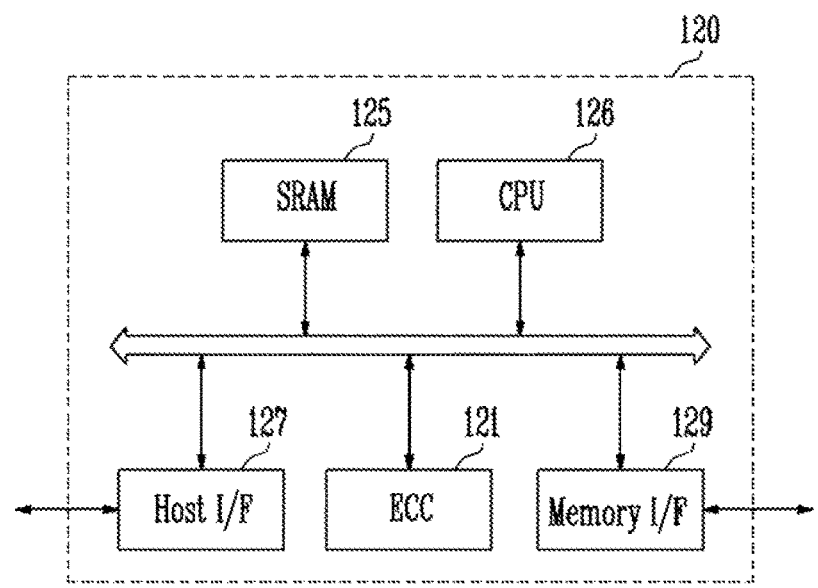
FIG. 8 is a block diagram illustrating an exemplary embodiment of a controller of the memory system.

FIG. 8 is a block diagram illustrating an exemplary embodiment of a controller of the memory system.

The data storing system 100 illustrated in FIG. 3 may be provided as a memory card or a Solid State Disk (SSD) by a combination of the semiconductor memory device 100 and the controller 200.

Referring to FIG. 8, the controller 120 may include an SRAM 125, a processing unit 126, a host interface 127, an error correcting unit 121, and a memory interface 129. The processing unit 126 and the SRAM 125 among the elements of FIG. 8 may be operated as the memory controller 220 of FIG. 3, and the error correcting unit 121 corresponds to an ECC 230 of the controller 200 of FIG. 3. The SRAM 125 is used as a working memory of the processing unit 126. In various exemplary embodiments, the SRAM 125 may also be included in the memory controller 220 of FIG. 3 or implemented as a separate RAM 210.

The host interface 127 includes a data exchange protocol of a host connected with a data storing system. The error correction block 121 detects and corrects an error included in the data read from the semiconductor memory device 100. The memory interface 129 interfaces with the semiconductor memory device 100 of the present disclosure. The processing unit 126 performs general control operations for data exchange of the controller 120.

Although it is not illustrated in the drawing, it is apparent to those skilled in the art that the memory system 50 according to the present disclosure may further include a ROM (not shown) storing code data for interfacing with the host. The semiconductor memory device 100 may also be provided in a form of a multi-chip package including a plurality of flash memory chips. The memory system 50 of the present disclosure may be provided as a storage medium having a low error generation probability and high reliability. Especially, the semiconductor memory device of the present disclosure may be included in a memory system, such as a semiconductor disk device (Solid State Disk: SSD)

that has been actively studied recently. In this case, the controller 120 may be configured to communicate with an external device (for example, the host) through one of various interface protocols, such as eMMC, UFS, USB, MMC, PCI-E, SATA, PATA, SCSI, ESDI, and IDE.

Figure 9:
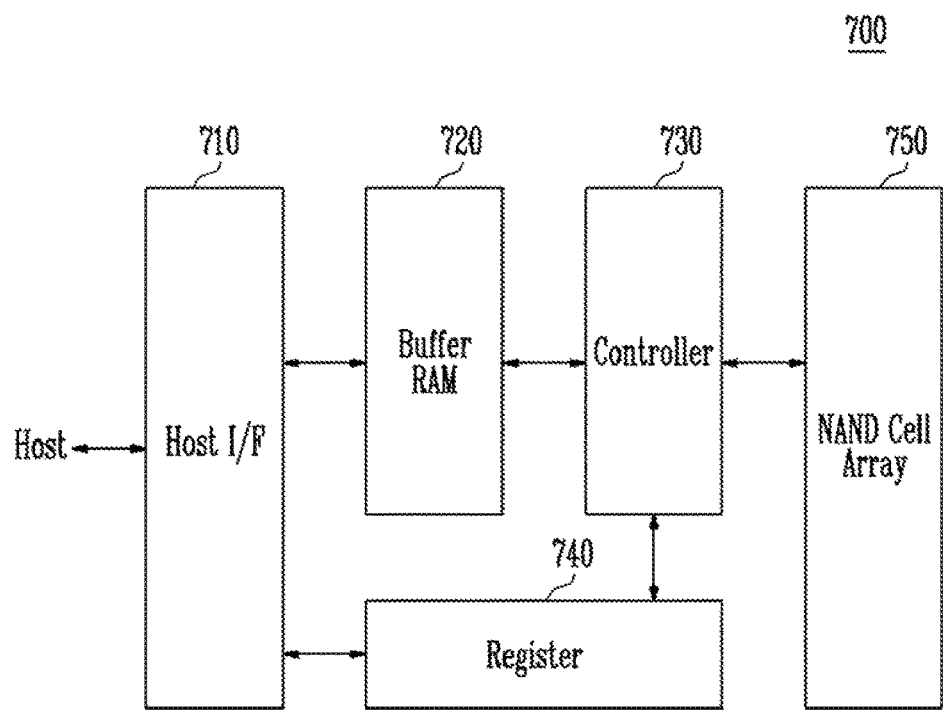
FIG. 9 is a diagram illustrating another exemplary embodiment of the memory system according to the present disclosure.

FIG. 9 is a diagram illustrating a fusion memory device or a fusion memory system as an example of a memory system according to the present disclosure. The technical features of the present disclosure may be applied a fusion memory device 700.

The fusion memory device 700 includes a host interface 710 for exchanging various information with a device using different protocols, a buffer RAM 720 including a code for driving the memory device, or temporarily storing data, a controller 730 configured to control a read, a program, and all states in response to a control signal and a command provided from the outside, a register 740 storing a command, an address, and data, such as configurations defining a system operating environment within the memory device, and a NAND flash cell array 750 formed of the operating circuit including nonvolatile memory cell and a page buffer. The fusion memory device programs the data in response to a write request from the host by the aforementioned method.

In FIG. 9, a NAND flash cell array 750 may correspond to the memory cell array 110 of FIG. 3, and the peripheral circuit 120, the memory controller 220, the RAM 210, and the ECC 230 of FIG. 3 may be included in the controller 730 of FIG. 7.

Figure 10:
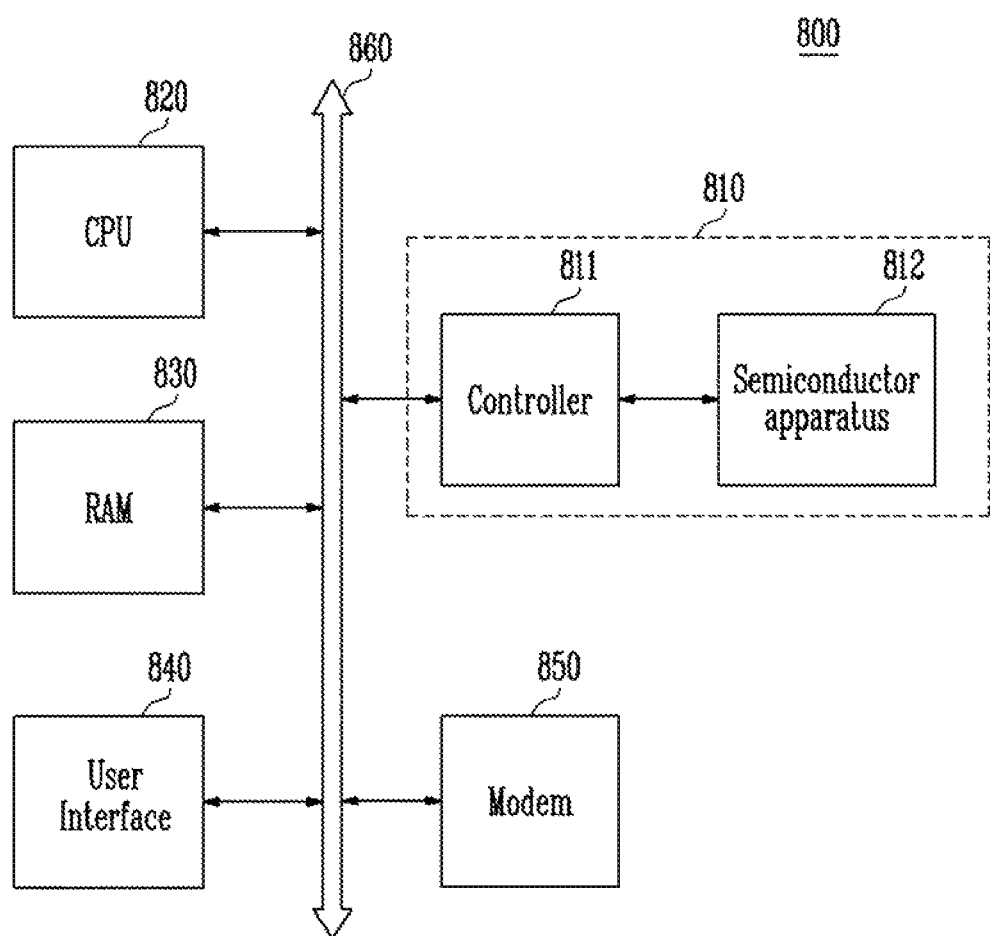
FIG. 10 is a diagram illustrating a computing system including the memory system.

FIG. 10 is a diagram illustrating a computing system including the memory system according to the present disclosure.

Referring to FIG. 10, a computing system 800 according to the present disclosure includes a microprocessor 820, a RAM 830, a user interface 840, a modem 850, such as a baseband chipset, and a memory system 810 electrically connected to a system bus 860. The controller 811 and the semiconductor device 812 of the memory system 810 may correspond to the controller and the semiconductor memory device of the present disclosure. If the computing system 800 according to the present disclosure is a mobile device, a battery (not shown) for supplying an operating voltage to the computing system 800 may be further provided. Although it is not illustrated in the drawings, it is apparent to those skilled in the art that the computing system 800 according to the present disclosure may further include an application chipset, a Camera Image Processor (CIS), a mobile DRAM, and the like. The memory system 810 may further include, for example, a Solid State. Drive/Disk (SSD) using a nonvolatile memory for storing data. Otherwise, the memory system 810 may be provided as a fusion flash memory.

The present invention is not limited to the embodiments and various modifications and variations may be made. Therefore, the scope of the present disclosure should be understood by the claims and their equivalents.

In the aforementioned exemplary embodiments, many operations may be selectively performed or omitted. Further, in each exemplary embodiment, the order of operations can be changed. In addition to the embodiment provided, other embodiment can be constructed based on the present invention.

What is claimed is:

1. A memory system, comprising:
a semiconductor memory device configured to include a plurality of memory blocks and a read retry storing unit, wherein each memory block includes a plurality of memory cells; and
a controller configured to control the semiconductor memory device to perform a read operation for selected memory cells among the plurality of memory cells and configured to transmit read retry table information to the semiconductor memory device when a read operation for the selected memory cells fails,
wherein the semiconductor memory device is further configured to determine a read retry voltage based on a read retry table stored in the read retry storing unit and the read retry table information received from the controller, and to perform a read retry operation with the read retry voltage,
wherein the controller does not fetch the read retry table from a Random-Access Memory (RAM) of the controller when the read retry voltage is determined by the semiconductor memory device,
wherein the read retry table is stored in one memory block among the plurality of memory blocks,
wherein the semiconductor memory device reads the read retry table from the one memory block and stores the read retry table in the read retry storing unit when power is supplied to the memory system, and
wherein the read retry table information is a set number indicating one among a plurality of offset voltages included in the read retry table.

2. The memory system of claim 1, wherein the read retry table information is any one of the plurality of offset voltages included in the read retry table or a command directing to apply one of the plurality of offset voltages of the read retry table according to a predetermined order.

3. The memory system of claim 1, wherein the controller includes an error correcting unit suitable for correcting an error bit of read data, comparing the number of error bits of the read data with a number of correctable error bits, and determining whether the read retry operation passes or fails.

4. The memory system of claim 1, wherein the controller further controls the read retry voltage to be stored in the semiconductor memory device when the read retry operation passes.

5. The memory system of claim 1, wherein when power is supplied to the memory system, the semiconductor memory device fetches the read retry table from the memory cells to the read retry table storing unit.

6. The memory system of claim 1, wherein when the read retry operation fails a predetermined number of times, the controller determines a page region, to which the read retry operation fails, as defective.

7. The memory system of claim 1, wherein the read retry table information is fetched from a One Time Programmable (OTP) region of the memory cells to the read retry table storing unit during operation of the memory system.

8. The memory system of claim 1, further comprising a host interface unit suitable for communicating with a host connected with the memory system.

9. The memory system of claim 8, further comprising a Read Only Memory (ROM) suitable for storing code data for interfacing with the host.

10. An operating method of a semiconductor memory device including a plurality of memory blocks and a read retry storing unit, wherein each memory block includes a plurality of memory cells and wherein a read retry table is stored in one memory block among the plurality of memory blocks, the method comprising:
storing the read retry table in the read retry storing unit from the memory cells when power is supplied to the semiconductor memory device;

receiving read retry table information generated by a controller of the semiconductor memory device;

determining a read retry voltage based on the read retry table information and the read retry table stored in the read retry storing unit; and performing a read retry operation with the determined read retry voltage, wherein the read retry table information is a set number indicating one among a plurality of offset voltages included in the read retry table, and wherein the controller of the semiconductor memory device does not fetch the read retry table from a Random-Access Memory (RAM) of the controller when the read retry voltage is determined by the semiconductor memory device.

11. The method of claim 10, wherein the read retry table information is any one of the plurality of offset voltages included in the read retry table or a command directing to apply one of the plurality of offset voltages of the read retry table according to a predetermined order.

12. The method of claim 10, further comprising correcting an error bit of read data, comparing the number of error bits of the read data with a number of correctable error bits, and determining whether the read retry operation passes or fails.

13. The method of claim 10, further comprising storing the read retry voltage when the read retry operation passes.

14. The method of claim 10, wherein the storing of the read retry table in the read retry storing unit is performed by fetching the read retry table from the memory cells to the read retry storing unit.

15. The method of claim 10, further comprising determining a page region, to which the read retry operation fails, as defective when the read retry operation fails a predetermined number of times.

16. The method of claim 10, wherein the storing of the read retry table in the read retry table storing unit is performed by fetching the read retry table information from a One Time Programmable (OTP) region of the memory cells to the read retry table storing unit during operation of the memory system.

* * * * *